United States Patent
Park et al.

(10) Patent No.: US 8,718,308 B2
(45) Date of Patent: May 6, 2014

(54) REPRODUCING APPARATUS AND METHOD FOR AUTOMATICALLY CONVERTING OUTPUT MODE BASED ON MOVEMENTS OF CASING

(75) Inventors: Soon Park, Yongin-si (KR); Jang-hwan Cho, Suwon-si (KR); Byong-woo Jeong, Seoul (KR); Kyung-suk Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1618 days.

(21) Appl. No.: 11/698,095

(22) Filed: Jan. 26, 2007

(65) Prior Publication Data
US 2008/0019550 A1    Jan. 24, 2008

(30) Foreign Application Priority Data
Jul. 24, 2006    (KR) .................. 10-2006-0069395

(51) Int. Cl.
*H04R 1/02* (2006.01)
*H04R 9/06* (2006.01)

(52) U.S. Cl.
USPC ........... 381/334; 381/332; 381/333; 381/335; 381/336; 381/123; 455/569.1; 455/575.4

(58) Field of Classification Search
USPC ................. 381/123, 333, 334, 335, 332, 336; 455/569.1, 575.1, 575.4
See application file for complete search history.

(56) References Cited

U.S. PATENT DOCUMENTS

| | | |
|---|---|---|
| 2002/0018027 A1 | 2/2002 | Sugimoto |
| 2002/0181722 A1 | 12/2002 | Hibino et al. |
| 2003/0008689 A1* | 1/2003 | Uda .............................. 455/569 |
| 2005/0083351 A1* | 4/2005 | Kawamoto et al. ........... 345/660 |
| 2006/0060762 A1* | 3/2006 | Chan et al. ..................... 250/221 |
| 2006/0073859 A1* | 4/2006 | Chou ......................... 455/575.4 |

FOREIGN PATENT DOCUMENTS

| | | |
|---|---|---|
| CN | 2455006 | 10/2001 |
| CN | 1667483 | 9/2005 |
| EP | 1 850 218 A2 | 10/2007 |
| JP | 2002-368860 | 12/2002 |
| KR | 2005-122525 | 12/2005 |

OTHER PUBLICATIONS

Office Action issued by The State Intellectual Property Office of People's Republic of China on Mar. 6, 2009.

* cited by examiner

*Primary Examiner* — Vivian Chin
*Assistant Examiner* — Paul Kim
(74) *Attorney, Agent, or Firm* — Jefferson IP Law, LLP

(57) ABSTRACT

A reproducing apparatus for automatically converting an output mode based on movements of a casing, and methods thereof. A reproducing apparatus having a first and a second casings includes an internal output unit outputting at least one of reproduced audio and video; an external output unit outputting at least one of the reproduced audio and video to an external device casing; a detector detecting movements of the second casing; and a control unit controlling such that at least one reproduced audio and video is outputted to at least one of the internal output unit and the external output unit. Accordingly, there is no need for a user to change the output mode, thereby reducing inconvenience for the user.

28 Claims, 4 Drawing Sheets

REPRODUCING APPARATUS AND METHOD FOR AUTOMATICALLY CONVERTING OUTPUT MODE BASED ON MOVEMENTS OF CASING

CROSS-REFERENCE TO RELATED APPLICATIONS

This application claims all benefits accruing under 35 U.S.C. §119 from Korean Patent Application No. 2006-69395, filed Jul. 24, 2006 in the Korean Intellectual Property Office, the disclosure of which is incorporated herein by reference.

BACKGROUND OF THE INVENTION

1. Field of the Invention

Aspects of the present invention relate to a reproducing apparatus and a method thereof, and more particularly, to a reproducing apparatus capable of reproducing audio and/or video files and a method thereof.

2. Related Art

Recently, electronic device casings have become increasingly diversified and sophisticated, having different kinds of designs. One of the challenges in the diversification in the design for electronic device casings, particularly portable electronic device casings, is to stimulate consumer's aesthetic appeal, thereby increasing sales in existing markets. Another challenge is to reduce the size of the device casings and to provide multi-functional portable electronic device casings.

In the latter case, the appearance of the electronic device casings can be transformed by the user, such as with a folder type mobile telephone, which can be folded while carrying the phone, and which can be unfolded during operation. In addition, the user may also be inconvenienced when using multi-functional electronic device casings, because the user has to set options related to the function of the device casings. Therefore, methods for improving convenience and simplicity in setting those options related to the function of the device casings are required.

SUMMARY OF THE INVENTION

Aspects of embodiments of the present invention solve at least the above problems and/or disadvantages and provide at least the advantages described below. Accordingly, aspects of embodiments of the present invention provide a reproducing apparatus and a method for converting output mode of an audio and/or a video on the basis of the position or movements of a device casing.

Additional aspects and/or advantages of the invention will be set forth in part in the description which follows and, in part, will be obvious from the description, or may be learned by practice of the invention.

Additional aspects and/or advantages of the invention will be set forth in part in the description which follows and, in part, will be obvious from the description, or may be learned by practice of the invention.

According to an aspect of the present invention, there is provided a reproducing device casing having a first casing coupled to a second casings, comprising: an internal output unit to output reproduced audio; an external output unit to output the reproduced audio to an external device; a detector to detect movements of the second casing relative to the first casing; and a control unit to control transmission of the reproduced audio to at least one of the inner output unit and the external output unit based on the detection, by the detector, of the movement of the second casing relative to the first casing.

According to an aspect of the present invention, the detector is disposed at the first casing to detect movements of the second casing relative to the first casing based on whether or not an emission is detected from electronic parts of the second casing.

According to an aspect of the present invention, the emission from the electronic parts comprises one of electric components, magnetic components, electromagnetic components, and light components.

According to an aspect of the present invention, the detector detects movements of the second casing relative to the first casing based on whether a magnetic field, emitted by a magnet of a speaker provided in the second casing, is detected.

According to an aspect of the present invention, the detector comprises one of a vertical magnetic sensor to sense the magnetic field through a sensor surface vertical to the magnetic field, and a horizontal magnetic sensor sense the magnetic field through a sensor surface horizontal to the magnetic field.

According to an aspect of the present invention, the inner output unit is provided inside the second casing, and the control unit controls such that the reproduced audio is output via the inner output unit when the second casing is moved from a position where the second casing covers the first casing to a position where the second casing uncovers the first casing.

According to an aspect of the present invention, one side of the second casing is a side from which the reproduced audio is outputted through the inner output unit.

According to an aspect of the present invention, a method for reproducing audio in a reproducing apparatus having a first casing coupled to a second casing, comprising: detecting a position of the second casing relative to the first casing; and controlling the output of reproduced audio to at least one of an internal output component and an external output component based on the detected position of the second casing relative to the first casing.

According to an aspect of the present invention, detecting the position of the second casing relative to the first casing comprises detecting movements of the second casing relative to the first casing based on whether an emission from electric parts of the second casing is detected.

According to an aspect of the present invention, the emission from the electric parts comprises any one of electric components, magnetic components, electromagnetic components, and light components.

According to an aspect of the present invention, detecting the position of the second casing relative to the first casing comprises detecting movements of the second casing relative to the first casing based on whether a magnetic field emitted from a magnet of a speaker in the second casing is detected.

According to an aspect of the present invention, controlling the output of the reproduced audio comprises outputting the reproduced audio via the internal output unit when the second casing is moved from a position where the second casing covers the first casing to a position where the second casing uncovers the first casing.

According to an aspect of the present invention, controlling the output of reproduced audio comprises outputting the reproduced output through the internal output unit, which is located in one side of the second casing.

According to an aspect of the present invention, a reproducing apparatus having a first casing coupled to a second casing comprises a detector to detect movements of the second casing relative to the first casing; and a control unit to set an output mode of a reproduced signal based on the detection, by the detector, or movements of the second casing relative to the first casing.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1A:
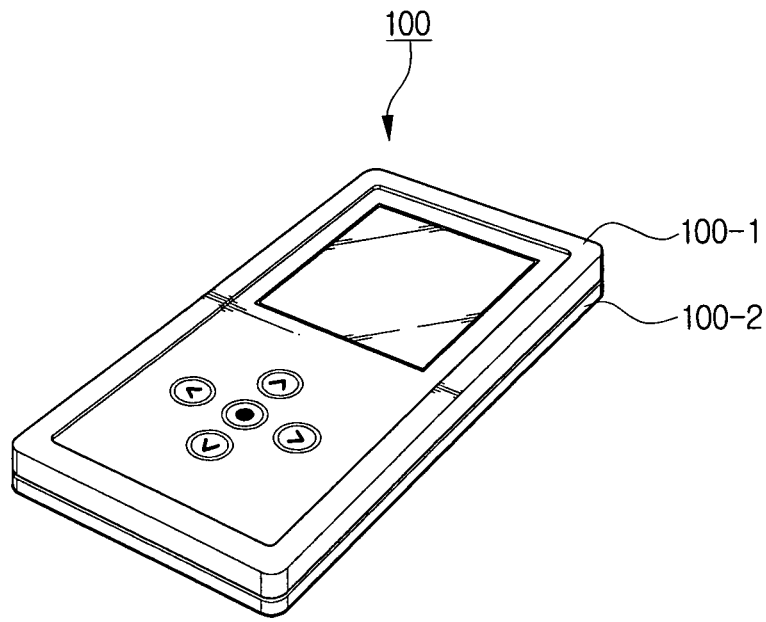
FIG. 1A and FIG. 1B are perspective views of an appearance of an audio reproducing apparatus according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1B:
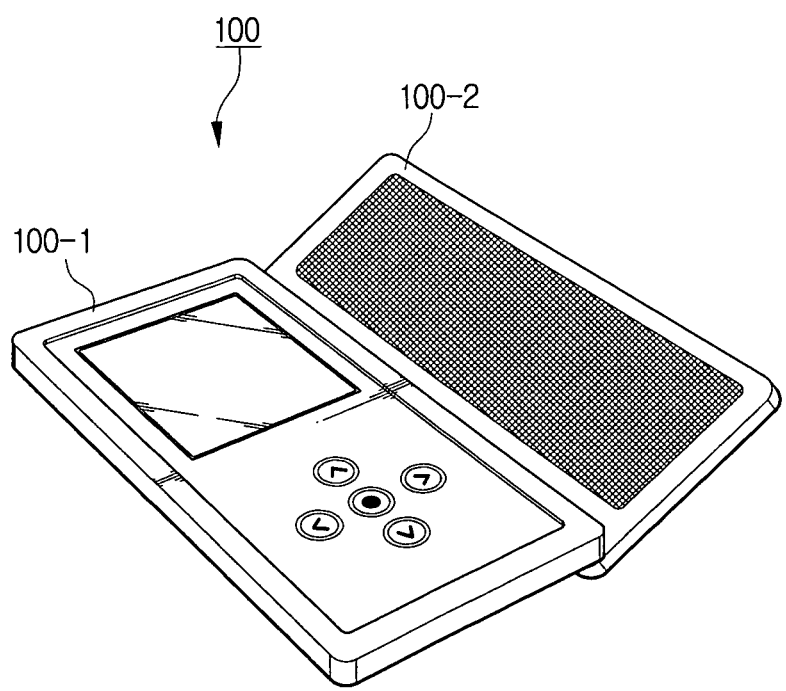

FIG. 1A and FIG. 1B are perspective views of an appearance of an audio reproducing apparatus according to an exemplary embodiment of the present invention. The audio reproducing apparatus 100 may have a structure of a main casing 100-1 combined with an auxiliary casing 100-2. In such a structure, the auxiliary casing 100-2 can have a predetermined angle of inclination after being slidably guided along a lower surface of the main casing 100-1. Other aspects of the invention may use different configurations, such as a hinge attaching the auxiliary casing 100-2 to the main casing 100-1.

A display and a control button are located on the outside of the main casing 100-1, and a detecting element (not illustrated), detecting movements of the auxiliary casing 100-2, is located inside the main casing 100-1. Such detecting element will be described later.

An internal speaker (not illustrated) and a battery (not illustrated) are provided inside the auxiliary casing 100-2. By moving the auxiliary casing 100-2, an audio output surface (illustrated in a checkered pattern) may be up against the lower surface of the main casing 100-1 as illustrated in FIG. 1A, or exposed to the outside as illustrated in FIG. 1B. Audio files can be transmitted to the user from the audio output side through the internal speaker inside the auxiliary casing 100-2.

A state in which the audio output side of the auxiliary casing 100-2 covers the lower surface of the main casing 100-1 and not to the outside, is a 'closed state' as illustrated in FIG. 1A. In addition, a state in which the audio output side of the auxiliary casing 100-2 uncovers the lower surface of the main casing 100-1 and is exposed to the outside is an 'open state' as illustrated in FIG. 1B. According to other aspects of the present invention, in the closed state the auxiliary casing may cover only a portion of the main casing 100-1.

Figure 2:
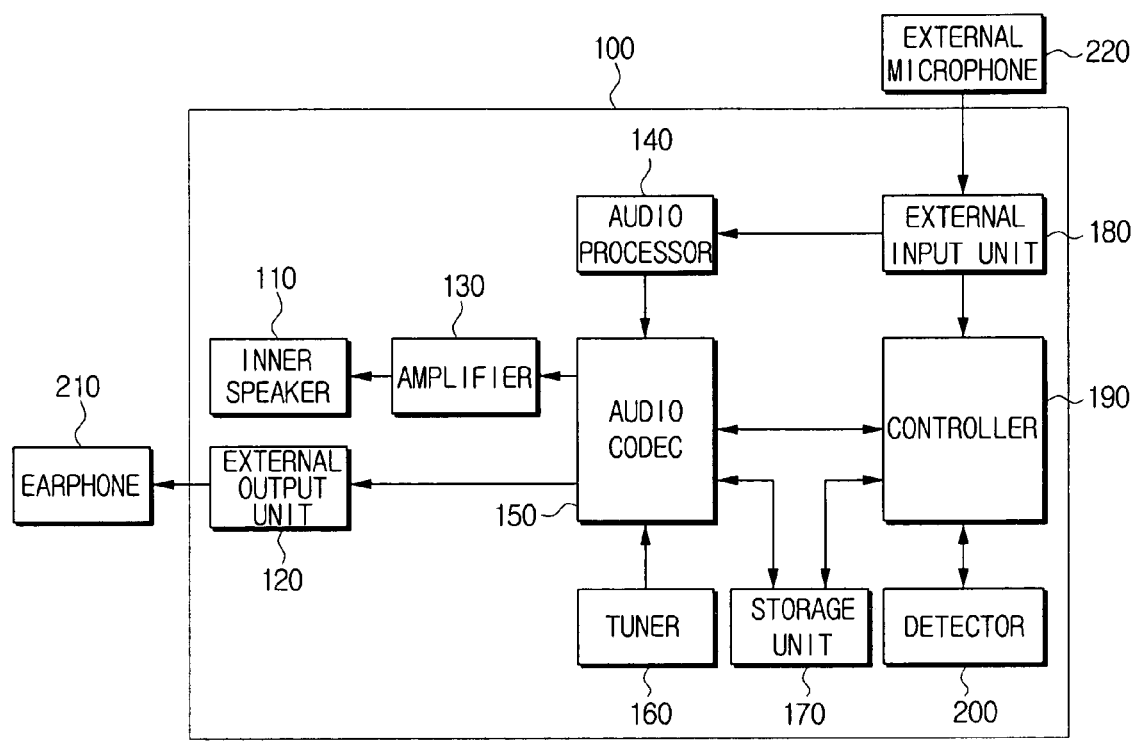
FIG. 2 is a block diagram of the audio reproducing apparatus according to an exemplary embodiment of the present invention.

FIG. 2 is a block diagram of the audio reproducing apparatus 100 as illustrated in FIGS. 1A and 1B. The audio reproducing apparatus 100 outputs a reproduced audio file through an internal speaker 110 or an earphone 210 connected to an external output unit 120 to provide the user with the audio. The audio file may be any type of file. For example, the audio file could be the audio portion of an audio/video (AV) file.

The audio reproducing apparatus 100 comprises an internal speaker 110, an external output unit 120, an amplifier 130, an audio processor 140, an audio codec 150, a tuner 160, a storage unit 170, an external input unit 180, a controller 190, and a detector 200.

The audio codec 150 reads audio data from a storage unit 170 under the control of the controller 190, and then compresses/decompresses the audio data.

The amplifier 130 amplifies an audio signal outputted from the audio codec 150. The internal speaker 110 is an output element inside the auxiliary casing 100-2, which outputs the audio file amplified by the amplifier 130.

The external output unit 120 transmits an audio signal outputted from the audio codec 150 through the earphone 210.

The detector 200 is a detecting element inside the main casing 100-1, detecting movements of the auxiliary casing 100-2. That is, the detector 200 detects the position of the auxiliary casing 100-2, thereby determining whether the state of the audio reproducing apparatus 100 is closed or open.

Figure 3A:
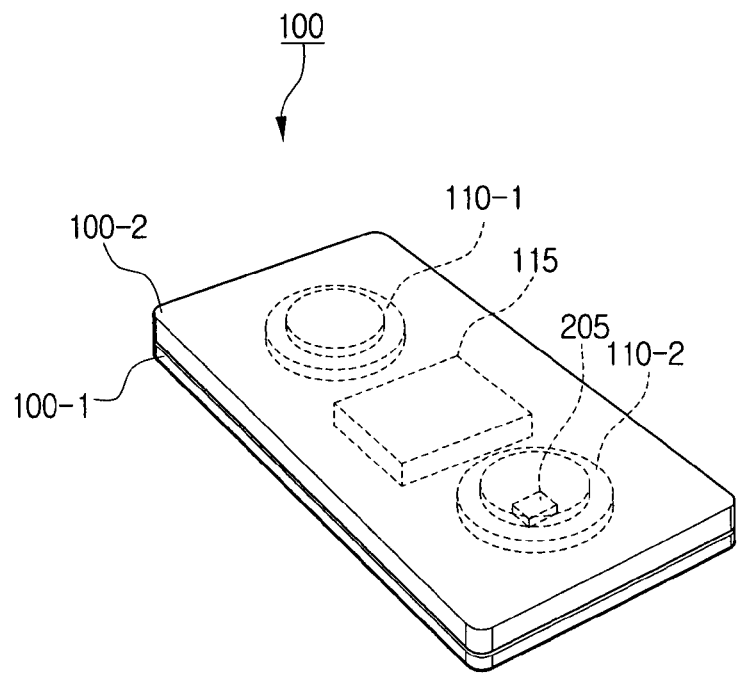
FIG. 3A and FIG. 3B are drawings illustrating a method for detecting movements of a casing of a reproducing apparatus according to an exemplary embodiment of the present invention.
Figure 3B:
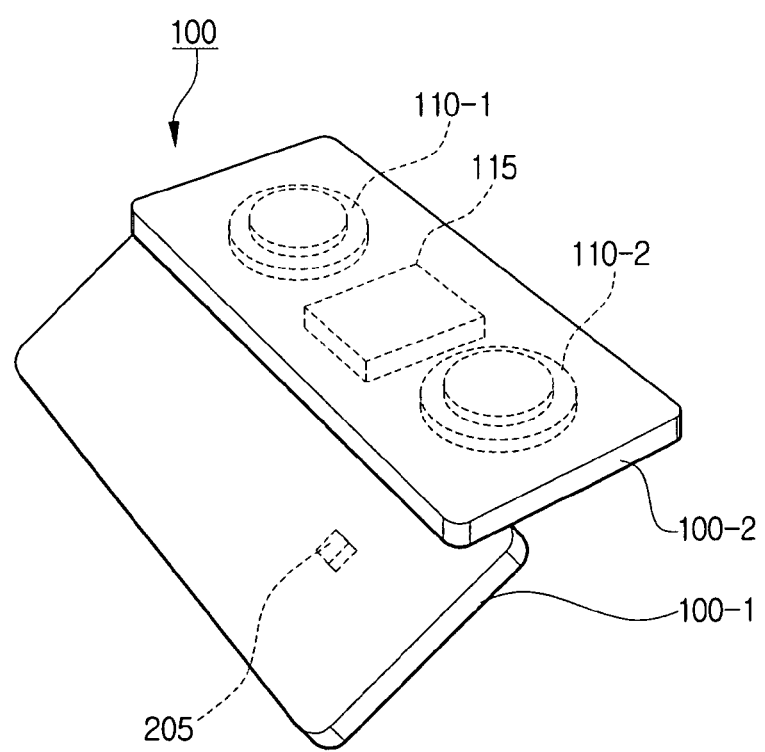

A method for detecting movements of the auxiliary casing 100-2 will be described in detail with reference to the accompanying drawing FIGS. 3A and 3B. FIGS. 3A and 3B are drawings illustrating a method for detecting movements of the auxiliary casing 100-2.

FIG. 3A illustrates the closed state of the audio reproducing apparatus 100. For the sake of convenience, FIG. 3A illustrates the audio reproducing apparatus 100 upside down, with the auxiliary casing 100-2 above the main casing 100-2. That is, the audio reproducing apparatus 100 illustrated in FIG. 3A is a reversed view of the audio reproducing apparatus 100 illustrated in FIG. 1A.

The first internal speaker 110-1 and the second internal speaker 110-2 of the internal speaker 110, located inside the auxiliary casing 100-2, are marked with dotted lines. In addition, the detector 200 disposed inside the main casing 100-1 is illustrated in FIG. 3A, and a Hall sensor 205 thereof is also marked with dotted lines. The Hall sensor 205 is a sensor detecting vertical incident magnetic field in the sensor surface. Other aspects of the present invention may use different types of sensors in different configurations.

The battery 115 is disposed between the first internal speaker 110-1 and the second internal speaker 110-2 inside the auxiliary casing 100-2. In order to improve space efficiency for the auxiliary casing 100-2, the battery 115 is disposed between the first and second internal speakers 110-1, 110-2. However, according to other aspects, the battery 115 may be located anywhere in the audio reproducing apparatus 100.

As illustrated in FIG. 3A, the Hall sensor 205 is positioned adjacent to the second internal speaker 110-2, in the closed state of the audio reproducing apparatus 100. The Hall sensor 205 senses the magnetic field through the sensor surface vertical to the magnetic field emitted from the magnetic provided in the internal speaker 110, thereby detecting that the audio reproducing apparatus 100 is in the closed state.

FIG. 3B illustrates the open state of the audio reproducing apparatus 100. In such state, the Hall sensor 205 is some distance apart from the second internal speaker 110-2. Accordingly, the Hall sensor 205 cannot sense the magnetic field emitted from the magnetic provided in the internal speaker 110 through the sensor surface, and thereby determines that the audio reproducing apparatus 100 is in the open state.

The results obtained by the detector 200 according to the above-described method are transmitted to the controller 190.

Referring again to FIG. 2, the control unit 190 determines an appropriate output mode based on the results obtained by the detector 200, and controls the function of the audio reproducing apparatus 100 according to the determined output mode for the audio file.

The audio output mode comprises an internal output mode in which audio files are outputted from the internal speaker 110 and an external output mode in which audio files are outputted from the earphone 210 through the external output unit 120.

The control unit 190 sets the audio output mode as an internal output mode if it is appropriate for the audio file to be outputted from the internal speaker 110 based on the movements of the auxiliary casing 100-2. For instance, as illustrated in FIGS. 1B and 3B, the output side of the audio file for the auxiliary casing 100-2 is exposed to the outside.

If it is inappropriate for the audio file to be outputted from the internal speaker 110 based on movements of the auxiliary casing 100-2, the controller 190 sets the audio output mode to an external output mode. This may occur when, as illustrated in FIGS. 1A and 3A, the audio output side of the auxiliary casing 100-2 is covers the lower surface of the main casing 100-1, that is, the audio output side of the auxiliary casing 100-2 is not exposed to the outside.

Figure 4:
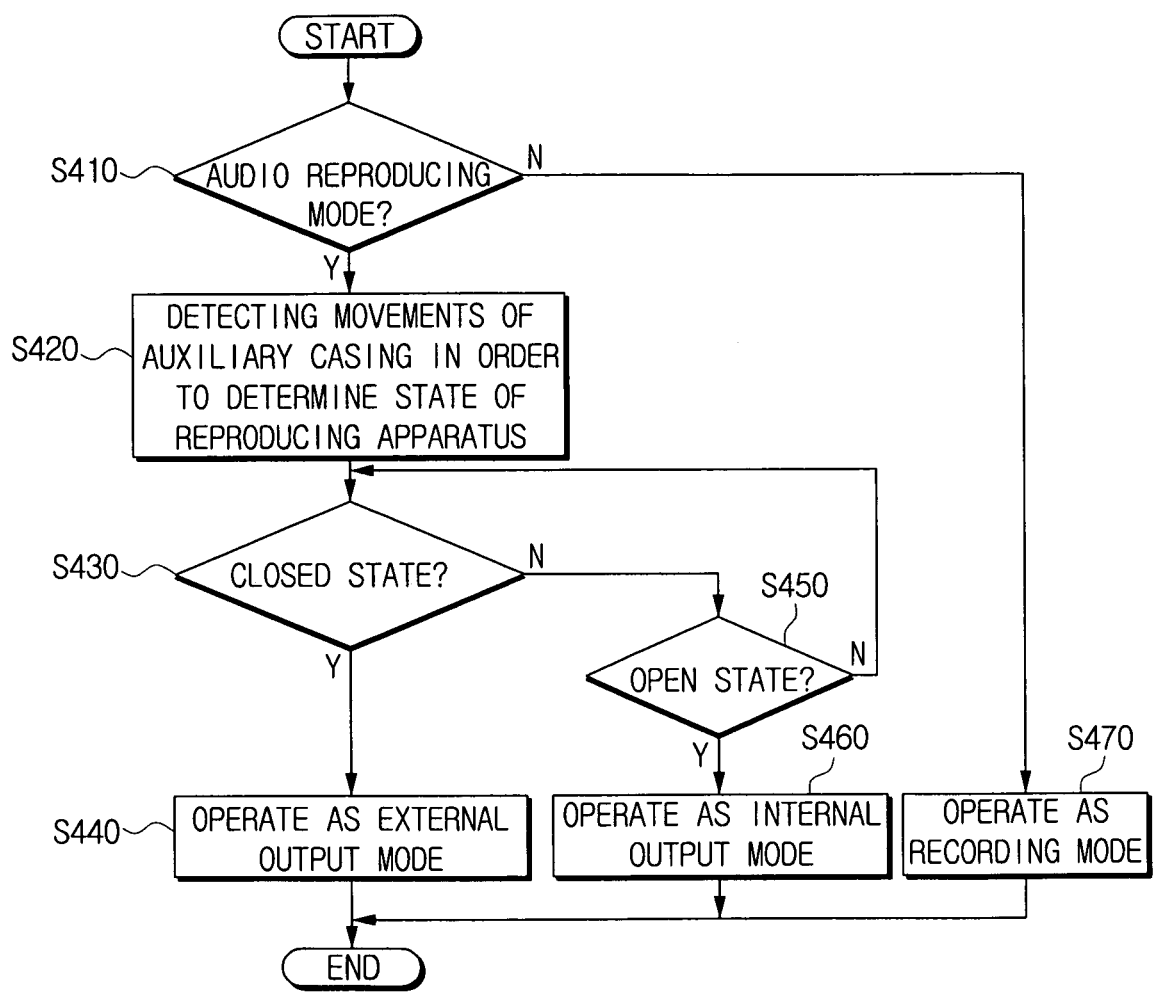
FIG. 4 is a flow chart describing a method for automatically converting an output mode based on movements of a casing according to an exemplary embodiment of the present invention.

The operation for setting the audio output mode illustrated in FIG. 2 will be explained in detail with reference to FIG. 4.

If an operating mode of the audio reproducing apparatus 100 is recognized as an audio reproducing mode, the detector 200 detects movements of the auxiliary casing 100-2 and determines the state of the audio reproducing apparatus 100 (S430). A method for detecting movements of the auxiliary casing 100-2 has been described above, with reference to FIGS. 3A and 3B.

If the audio reproducing apparatus 100 is determined to be in the closed state (S430-Y), the controller 190 changes operation of the audio reproducing apparatus the external output mode (S440). In such a situation, the audio output side of the auxiliary casing 100-2 is not exposed to the outside. In the external output mode, the audio signal of the audio codec 150 is transmitted to the earphone 210 through the external output unit 120.

If the audio reproducing apparatus 100 is determined to be in the open state (S450-Y), the controller 190 changes operation of the audio reproducing apparatus to the internal output mode (S460). In such a situation, the audio output side of the auxiliary casing 100-2 is exposed to the outside. In the internal output mode, the audio signal of the audio codec 150 is amplified by the amplifier 130 and output through the internal speaker 110.

If the operating mode of the audio reproducing apparatus 100 is recognized as a recording mode (S410-N), however, the controller 190 controls the audio reproducing apparatus 100 to perform recording (S470). In the recording mode, an analog audio signal is received from the external microphone 220 through the external input unit 180, converted into a digital audio signal by the audio processor 140, compressed in the audio codec 150, and stored in the storage unit 170.

A detailed description with reference to an audio reproducing apparatus, which automatically sets an audio output mode appropriately, by detecting the position and/or movement of an auxiliary casing 100-2, has been described above.

According to an exemplary embodiment of the present invention, the detector 200 uses a Hall sensor 205 disposed opposite to the second internal speaker 110-2. It is possible for the detector 200 to use two Hall sensors, each of which are disposed opposite to the first and second internal speakers 110-1, 110-2.

According to another exemplary embodiment of the present invention, the Hall sensor, which senses the magnetic field through the sensing face vertical to the magnetic field, has been described as an example of an element sensing the magnetic field emitted from the magnet disposed at the internal speaker 110, but it is not limited thereto. Accordingly, the technical concepts and vision of the present invention can be applied by using a horizontal magnetic sensor.

Both types of magnetic sensor may be appropriate, depending on the position of the internal speaker 110. A vertical magnetic sensor may be used when the magnetic field is vertically emitted from the spot where the magnetic field emitted from the internal speaker 110 can be detected. However, if the magnetic field is emitted horizontally to the spot where the magnetic filed emitted from the internal speaker 110 is detected, a horizontal magnetic sensor may be used.

According to still another exemplary embodiment of the present invention, the detector 200 detects movements of the auxiliary casing 100-2 by sensing the magnetic field emitted from the magnet in the internal speaker 110. However, the present invention also can be applied by using separate magnets other than those in the internal speaker 110. By using the magnet provided at the internal speaker 110, however, there is no need to buy separate magnets. Therefore the cost and size can be reduced.

According to still another exemplary embodiment of the present invention, the auxiliary casing 100-2 can be detected by sensing the magnetic field, but is not limited thereto. Accordingly, the technical concepts and vision of the present invention can be applied when using magnetic elements such as a magnetic field, electric elements such as an electronic field, light elements such as IR/visible lights, and even electromagnetic elements.

According to still another exemplary embodiment of the present invention, the auxiliary casing 100-2 is at a predetermined angle of inclination after being slidably guided along a lower surface of the main casing 100-1, but the present invention can also be applied in the case that the auxiliary casing 100-2 moves in other ways. For example, the auxiliary casing and main casing may be attached by a hinge, about which the auxiliary casing may pivot.

Although an audio reproducing apparatus 100 having two casings has been described, according to an exemplary embodiment of the present invention, the present invention can also be applied in the case of an audio reproducing apparatus 100 having three or more casings.

The technical concepts of the reproducing apparatus, according to exemplary embodiments of the present invention, can also be applied to any AV reproducing apparatus capable of supporting not only audio reproducing apparatuses such as MP3 players, but also video reproducing apparatuses or apparatuses capable of reproducing both video and audio files (e.g. DMB player, personal digital assistant, video player, HDD player, mobile phone, car navigator etc.).

The reproducing apparatus according to exemplary embodiments of the present invention automatically converts audio and/or video output modes based on movements or position of the casing, therefore preventing inconveniences in converting every output mode for every situation. Furthermore, there is no need for extra components to detect movements of the reproducing apparatus, since existing components, such as the internal speaker, may be used. As a result, the cost and size can be reduced.

Various components of the audio reproducing apparatus, as shown in FIGS. 1-3, such as control unit 190, audio codec 150, or audio processor 140, may be integrated into a single control unit, or alternatively, can be implemented in software or hardware, such as, for example, a field programmable gate array (FPGA) and an application specific integrated circuit (ASIC). As such, it is intended that the processes described herein to be broadly interpreted as being equivalently performed by software, hardware, or a combination thereof. Software modules can be written via a variety of software languages. These software modules may include data and instructions which can also be stored on one or more machine-readable storage media, such as dynamic or static read-only memories (EPROMs), electrically erasable and programmable read-only memories (EEPROMs) and flash memories; magnetic disks such as fixed, floppy, and removable disks; other magnetic media including tape; and optical media such as compact discs (CDs) or digital video discs (DVDs). For example, code segments including instructions stored on floppy disks, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical acoustical, electromagnetic, or other types of signals.

In addition, aspects of the present invention can also be embodied as computer readable codes on a computer readable recording medium. The computer readable recording medium may be any data storage device that can store data which can be thereafter read by a computer system. Examples of a computer readable recording medium also include read-only memory (ROM), random access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, alternative embodiments of the invention can be implemented as a computer program product for use with a computer system. Such a computer program product can be, for example, a series of computer instructions stored on a tangible recording medium, such as diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical, or other memory device. Furthermore, the software modules as described can also be machine-readable storage media, such as dynamic or static random access memories (DRAM or SRAM), erasable and programmable read-only memories (EEPROMs), and flash memories; magnetic disks such as fixed, floppy, and removable disks; other magnetic media including tape; and optical media such as compact discs (CDs_ and digital video discs (DVDs). Accordingly, it is intended, therefore, that the present invention not be limited to the various example embodiments disclosed, but that the present invention includes all embodiments falling within the scope of the appended claims.

What is claimed is:

1. A reproducing apparatus having a first casing couple to a second casing, the apparatus comprising:
   an internal output unit configured to output reproduced audio, the internal output unit being provided inside the second casing;
   an external output unit configured to output the reproduced audio to an external device;
   a detector configured to detect movements of the second casing relative to the first casing; and
   a control unit configured to control the transmission of the reproduced audio to the internal output unit when the second casing is open and to control the transmission of the reproduced audio to the external output unit when the second casing is closed based on the detection, by the detector, of the movement of the second casing relative to the first casing,
   wherein the internal output unit is exposed when the second casing is open, and wherein the second casing has a preset angle of inclination with respect to the first casing when opened after being slidably guided along a lower surface of the first casing, and
   wherein the control unit controls such that the reproduced audio is output, via the internal output unit, when the second casing is moved slidingly from a position where the second casing covers the first casing to a position where the second casing uncovers the first casing.

2. The apparatus according to claim 1, wherein the detector is disposed in the first casing to detect movements of the second casing relative to the first casing based on whether an emission is detected from electronic parts of the second casing.

3. The apparatus according to claim 2, wherein the emission from the electronic parts comprises one of electric components, magnetic components, electromagnetic components, and light components.

4. The apparatus according to claim 2, wherein the detector detects movements of the second casing relative to the first casing based on whether a magnetic field, emitted by a magnet of a speaker provided in the second casing, is detected.

5. The apparatus according to claim 4, wherein the detector comprises one of a vertical magnetic sensor to sense the magnetic field through a sensor surface vertical to the magnetic field, and a horizontal magnetic sensor to sense the magnetic field through a sensor surface horizontal to the magnetic field.

6. The apparatus according to claim 1, wherein the second casing comprises one side that is a side from which the reproduced audio files are output through the internal output unit.

7. A method for reproducing audio in a reproducing apparatus having a first casing coupled to a second casing, the method comprising:
 detecting a position of the second casing relative to the first casing; and
 controlling the output of reproduced audio to an internal output component when the second casing is open and controlling the output of the reproduced audio to an external output component when the second casing is closed based on the detected position of the second casing relative to the first casing,
 wherein the internal output component is exposed when the second casing is open, and wherein the second casing has a preset angle of inclination with respect to the first casing when opened after being slidably guided along a lower surface of the first casing,
 wherein the internal output component is located inside second casing, and
 wherein controlling the output of reproduced audio comprises outputting the reproduced audio to an internal output unit when the second casing is moved from a position in which the first casing is covered by the second casing to a position in which the first casing is not covered by the second casing.

8. The method according to claim 7, wherein the detecting of the position of the second casing relative to the first casing comprises detecting movements of the second casing relative to the first casing based on whether an emission from electric parts of the second casing is detected.

9. The method according to claim 8, wherein the emission from the electric parts comprises any one of electric components, magnetic components, electromagnetic components, and light components.

10. The method according to claim 8, wherein the detecting of the position of the second casing comprises detecting movements of the second casing based on whether a magnetic field emitted from a magnet of a speaker in the second casing is detected.

11. The method according to claim 7, wherein the controlling of the output of the reproduced audio based on the detected position of the second casing relative to the first casing comprises outputting the reproduced audio through the internal output unit, which is located in one side of the second casing.

12. A reproducing apparatus having a first casing coupled to a second casing, the apparatus comprising:
 a detector configured to detect movements of the second casing relative to the first casing;
 a control unit configured to set an output mode of a reproduced signal, based on the detected movements of the second casing relative to the first casing; and
 an internal output unit provided inside the second casing,
 wherein, when the second casing is open, the internal output unit is exposed and the reproduced signal is output to the internal output unit, and wherein the second casing has a preset angle of inclination with respect to the first casing when opened after being slidably guided along a lower surface of the first casing, and
 wherein the control unit sets the output mode such that the reproduced audio is output via the internal output unit when the second casing is moved from a position where the second casing covers the first casing to a position where the second casing uncovers the first casing.

13. The apparatus according to claim 12, wherein the detector is disposed in the first casing and detects movements of the second casing relative to the first casing based on whether an emission is detected from electronic parts of the second casing.

14. The apparatus according to claim 13, wherein the emission from the electronic parts comprises electric components.

15. The apparatus according to claim 13, wherein the emission from the electronic parts comprises magnetic components.

16. The apparatus according to claim 13, wherein the emission from the electronic parts comprises electromagnetic components.

17. The apparatus according to claim 13, wherein the emission from the electronic parts comprises light components.

18. The apparatus according to claim 13, wherein the detector detects movements of the second casing relative to the first casing based on whether a magnetic field, emitted by a magnet of a speaker provided in the second casing, is detected.

19. The apparatus according to claim 18, wherein the detector comprises a vertical magnetic sensor to sense the magnetic field through a sensor surface vertical to the magnetic field.

20. The apparatus according to claim 18, wherein the detector comprises a horizontal magnetic sensor to sense the magnetic field through a sensor surface horizontal to the magnetic field.

21. The apparatus according to claim 12, wherein the second casing comprises one side that is a side from which the reproduced signal is output through the internal output unit.

22. A non-transitory computer readable medium having stored thereon instructions which, when executed by a portable apparatus having a first casing coupled to a second casing, perform a method comprising:
 detecting a position of the second casing relative to the first casing; and
 controlling an output of reproduced audio based on the detected position of the second casing relative to the first casing,
 wherein, when the second casing is open, an internal output unit is exposed and the reproduced audio is output to the internal output unit, and wherein the second casing has a preset angle of inclination with respect to the first casing when opened after being slidably guided along a lower surface of the first casing,
 wherein the internal output unit is located inside second casing, and
 wherein controlling the output of the reproduced audio comprises outputting the reproduced audio via an internal output unit provided within the second casing when the second casing is moved from a position where the second casing covers the first casing to a position where the second casing uncovers the first casing.

23. The non-transitory computer readable medium according to claim 22, wherein the detecting of the position comprises detecting movements of the second casing relative to the first casing based on whether an emission is detected from electronic parts of the second casing.

24. The non-transitory computer readable medium according to claim 23, wherein the emission from the electronic parts comprises electric components.

25. The non-transitory computer readable medium according to claim 23, wherein the emission from the electronic parts comprises magnetic components.

26. The non-transitory computer readable medium according to claim 23, wherein the emission from the electronic parts comprises electromagnetic components.

27. The non-transitory computer readable medium according to claim 23, wherein the emission from the electronic parts comprises light components.

28. The non-transitory computer readable medium according to claim 23, wherein the detecting of the position of the second casing comprises detecting movements of the second casing relative to the first casing based on whether a magnetic field, emitted by a magnet of a speaker provided in the second casing, is detected.

\* \* \* \* \*